United States Patent
Leone et al.

(10) Patent No.: US 10,036,333 B2
(45) Date of Patent: Jul. 31, 2018

(54) CYLINDER DEACTIVATION CONTROL SYSTEM

(71) Applicant: Ford Global Technologies, LLC, Dearborn, MI (US)

(72) Inventors: Thomas G. Leone, Ypsilanti, MI (US); Kenneth James Miller, Canton, MI (US); Chris James Hocking, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/155,552

(22) Filed: May 16, 2016

(65) Prior Publication Data

US 2017/0328287 A1  Nov. 16, 2017

(51) Int. Cl.
*F02D 17/02* (2006.01)
*F02D 41/02* (2006.01)

(52) U.S. Cl.
CPC ......... *F02D 17/02* (2013.01); *F02D 41/0225* (2013.01)

(58) Field of Classification Search
CPC .............................. F02D 17/02; F02D 41/0225
See application file for complete search history.

(56) References Cited

U.S. PATENT DOCUMENTS

| | | | |
|---|---|---|---|
| 6,436,005 B1 | 8/2002 | Bellinger | |
| 6,786,191 B2 | 9/2004 | Foster | |
| 6,874,383 B2 | 4/2005 | Sayman et al. | |
| 7,278,391 B1 | 10/2007 | Wong et al. | |
| 7,499,784 B2 | 3/2009 | Kresse | |
| 7,637,842 B2 | 12/2009 | Tamai et al. | |
| 7,836,866 B2 | 11/2010 | Luken et al. | |
| 8,050,856 B2 | 11/2011 | Duty et al. | |
| 8,108,132 B2 | 1/2012 | Reinke | |
| 8,660,734 B2 | 2/2014 | Zhu et al. | |
| 8,755,959 B2 | 6/2014 | Fassnacht | |
| 8,882,636 B2 | 11/2014 | Pietron et al. | |

(Continued)

FOREIGN PATENT DOCUMENTS

| CN | 102337974 A | 2/2012 |
|---|---|---|
| CN | 205370771 U | 7/2016 |

OTHER PUBLICATIONS

Wilcutts, Mark, et al, "Design and Benefits of Dynamic Skip Fire Strategies for Cylinder Deactivated Engines", SAE International, Apr. 8, 2013 (11 pages).

(Continued)

*Primary Examiner* — Joseph Dallo
(74) *Attorney, Agent, or Firm* — Frank A. MacKenzie; Bejin Bieneman PLC

(57) ABSTRACT

A vehicle includes a transmission; a torque converter coupled to the transmission; a controller in communication with the transmission and the torque converter; a driver seat, a passenger seat, and a back seat coupled to the transmission; and sensors configured to detect user occupancy of the seats. The sensors are in communication with the controller. The controller is programmed to receive data from the sensors, determine an occupancy status based on the occupancy data, set an engine operating parameter of one of the transmission and the torque converter based on the occupancy status, and control one or both of the transmission and the torque converter to operate according to the parameter.

20 Claims, 6 Drawing Sheets

(56) References Cited

U.S. PATENT DOCUMENTS

| | | |
|---|---|---|
| 8,948,955 B2 | 2/2015 | Zhu et al. |
| 9,008,854 B2 | 4/2015 | Breed |
| 9,082,239 B2 | 7/2015 | Ricci |
| 9,086,020 B2 | 7/2015 | Pirjaberi et al. |
| 2005/0052080 A1 | 3/2005 | Maslov et al. |
| 2007/0112502 A1* | 5/2007 | Asano ................. F02D 41/1498 701/111 |
| 2008/0196954 A1 | 8/2008 | Soliman et al. |
| 2009/0139789 A1 | 6/2009 | Yang |
| 2011/0112708 A1 | 5/2011 | Fassnacht |
| 2011/0208403 A1* | 8/2011 | Tsumiyama .......... F02D 41/021 701/102 |
| 2011/0246021 A1 | 10/2011 | Prokhorov |
| 2012/0109438 A1 | 5/2012 | Akebono et al. |
| 2013/0092127 A1* | 4/2013 | Pirjaberi ............. F02D 41/0087 123/406.23 |
| 2014/0053804 A1 | 2/2014 | Rayl et al. |
| 2014/0090624 A1* | 4/2014 | Verner ................ F02D 41/0087 123/406.12 |
| 2014/0244106 A1 | 8/2014 | Singer et al. |
| 2015/0203106 A1 | 7/2015 | Zhao et al. |
| 2015/0260117 A1 | 9/2015 | Shost et al. |
| 2016/0214596 A1 | 7/2016 | Glugla et al. |
| 2016/0328976 A1* | 11/2016 | Jo ........................ F02D 41/403 |

OTHER PUBLICATIONS

UKIPO Search Report dated Aug. 24, 2017 for Application No. GB1707219.0 (5 pages).
Non-Final Office Action dated Jun. 14, 2018; U.S. Appl. No. 15/181,491.
Non-Final Office Action dated Jun. 4, 2018; U.S. Appl. No. 15/155,502.

\* cited by examiner

US 10,036,333 B2

CYLINDER DEACTIVATION CONTROL SYSTEM

BACKGROUND

A powertrain of a vehicle includes an engine, a torque converter, and a transmission coupled in series. If the engine is an internal-combustion engine, the engine contains cylinders that serve as combustion chambers that convert fuel to rotational kinetic energy. The torque converter transmits rotational motion from the engine to the transmission while allowing slippage between the engine and transmission, for example, while the engine is running and the vehicle is stopped. The transmission transmits the kinetic energy from the torque converter to a drive axle and ultimately to wheels of the vehicle, while applying a gear ratio allowing different tradeoffs between torque and rotational speed.

Noise, vibration, and harshness (NVH) constraints can limit the fuel economy possible for the powertrain. Deactivating cylinders of the engine can increase the efficiency of the engine, but running the engine with fewer cylinders can cause torque pulsations that are unpleasant for occupants of the vehicle. Likewise, reduced slippage in the torque converter can increase the efficiency of the powertrain, but reduced slippage also transmits more vibrational shocks from the engine to occupants. And finally, reducing the vehicle speeds at which gear shifts occur or gear ratios change can increase fuel economy but may also increase the noise and vibrations experienced by occupants.

DETAILED DESCRIPTION

Figure 1:
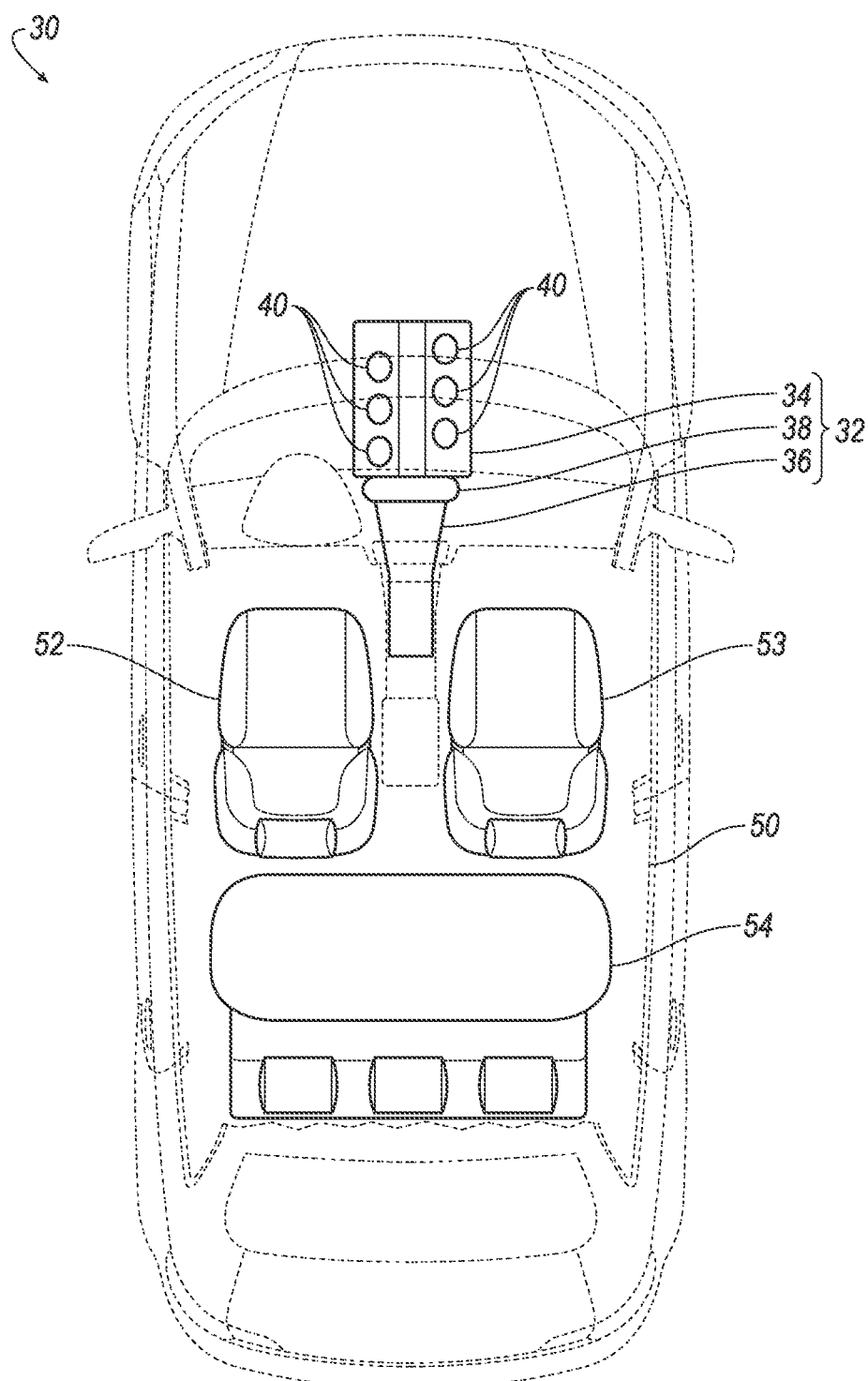
FIG. 1 is a top view of an example vehicle.

With reference to the Figures, wherein like numerals indicate like parts throughout the several views, a vehicle 30 includes a transmission 36; a torque converter 38 coupled to the transmission 36; a controller 60 in communication with the transmission 36 and the torque converter 38; a driver seat 52, a passenger seat 53, and a back seat 54 coupled to the transmission 36; and sensors 64 configured to detect user occupancy of the seats 52, 53, 54. The sensors 64 are in communication with the controller 60. The controller 60 is programmed to receive data from the sensors 64, determine an occupancy status based on the occupancy data, set an engine operating parameter of one of the transmission 36 and the torque converter 38 based on the occupancy status, and control one or both of the transmission 36 and the torque converter 38 to operate according to the parameter.

Setting the engine operating parameter based on the occupancy status increases the efficiency of the vehicle 30 at the expense of increasing noise, vibration, and/or harshness (NVH) in situations in which the increased NVH is less likely to be experienced by occupants. If the vehicle 30 is autonomous, then the vehicle 30 may be unoccupied, or occupants may be seated only in the back seat 54 and not the driver or passenger seats 52, 53, or an occupant may be seated in the passenger seat 53 and not the driver seat 52. Occupants of the back seat 54 may be less exposed to NVH from an engine 34, torque converter 38, and transmission 36 than occupants of the driver or passenger seats 52, 53, and the occupants of the driver seat 52 and the passenger seat 53 may have different NVH exposures. Increased NVH has less downside in some of these occupancy statuses than others, so it becomes more acceptable to trade off NVH for greater efficiency of the vehicle 30.

The vehicle 30 may be an autonomous vehicle. In this context, "autonomous" means that each of vehicle 30 propulsion (e.g., a powertrain including an internal combustion engine), steering, and braking are controlled by the controller 60 without human intervention. The controller 60, sometimes referred to as the "virtual driver," may be capable of operating the vehicle 30 independently of the intervention of a human driver, to a greater or a lesser degree, e.g., the vehicle 30 could be operated semi-autonomously, meaning that one or two of propulsion, steering, and braking are controlled by the controller 60 without human intervention. The controller 60 may be programmed to operate the engine 34, the torque converter 38, the transmission 36, a braking system, a steering system, and/or other vehicle systems. The controller 60 may have an autonomous mode, in which the controller 60 operates the vehicle 30, and semi-autonomous and/or manual modes, in which a human driver operates some or all of the subsystems of the vehicle 30 pertaining to propulsion, steering, and braking.

As shown in FIG. 1, the vehicle 30 includes a passenger cabin 50 to house occupants, if any, of the vehicle 30. The passenger cabin 50 includes a driver seat 52 and a passenger seat 53 disposed at a front of the passenger cabin 50 and one or more back seats 54 disposed behind the driver and passenger seats 52, 53. The passenger cabin 50 may also include third-row seats (not shown) at a rear of the passenger cabin 50. In FIG. 1, the driver and passenger seats 52, 53 are shown to be bucket seats and the back seat 54 is a bench seat, but the seats 52, 53, 54 may be other types. The seats 52, 53, 54 may be coupled to the transmission 36, that is, directly or indirectly mechanically connected to the transmission 36; specifically, the seats 52, 53, 54 may be coupled to a frame of the vehicle 30 (not shown), and the transmission 36 may be coupled to the frame. The position and orientation of the seats 52, 53, 54 and components thereof may be adjustable by an occupant.

The vehicle 30 includes a powertrain 32, which includes the engine 34; the torque converter 38, which is coupled to the engine 34, that is, directly or indirectly drivably connected to the engine 34; and the transmission 36, which is coupled to the torque converter 38. The powertrain 32 produces energy and converts the energy into rotational motion of wheels 44 that propel the vehicle 30.

The engine 34 may be an internal combustion engine, an electric engine, or a hybrid electric engine. In an internal combustion or hybrid engine, the engine 34 includes a plurality of cylinders 40.

The cylinders 40 operate as combustion chambers in which a chemical reaction of a fuel translates into kinetic energy of a piston (not shown) of the cylinder 40. The pistons of the cylinders 40 are coupled to the torque converter 38 such that linear movement of the pistons drives rotational motion of the torque converter 38. The cylinders 40 of the engine 34 fire in a predefined sequence.

Figure 3:
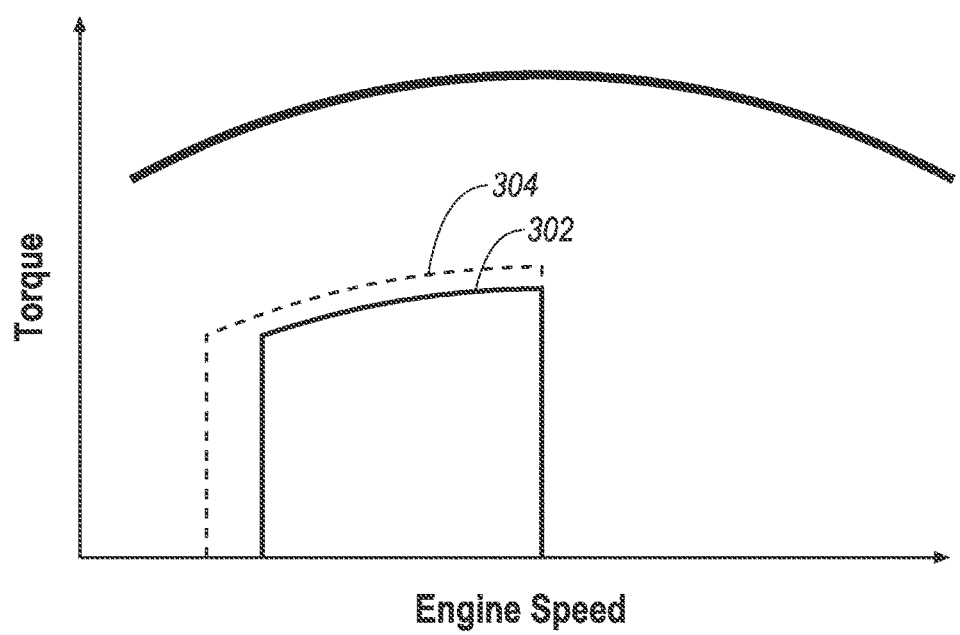
FIG. 3 is a graph of example cylinder-deactivation schedules.

The engine 34 may use all of the cylinders 40 to power the vehicle 30 or may use a set of active cylinders 40 including less than all the cylinders 40. FIG. 3 shows an example cylinder deactivation schedule. The deactivation schedule may be a function of the engine speed (cycles per unit time) and the torque produced by the engine 34. In a region 302 between threshold values of the engine speed and below a torque curve, some cylinders 40 are deactivated, and outside the region 302, all cylinders 40 are active. For example, if the engine 34 has six cylinders 40, then only four cylinders 40 may be active if the engine speed and torque are within the region 302.

The torque converter 38 is coupled to the engine 34 and to the transmission 36. The torque converter 38 transmits rotational motion from the engine 34 to the transmission 36. The torque converter 38 decouples the motion of the engine 34 from the motion of the transmission 36, allowing the engine 34 to, for example, continue running while the vehicle 30 is stopped. When the vehicle 30 is moving, the torque converter 38 allows the engine speed to be higher than the input speed of the transmission 36. The difference in speed across the torque converter 38 from the engine speed to the input speed of the transmission 36 is called "slip." The torque converter 38 has a lock-up clutch that can reduce or eliminate slip by establishing a mechanical connection through the lock-up clutch to connect the engine 34 and the transmission 36, thus allowing a variable slip. Using the lock-up clutch, the torque converter 38 can switch between an unlocked state with a positive rate of slip and a locked state with zero rate of slip. In the unlocked state, the torque converter 38 allows slippage between the engine 34 and the transmission 36, transmitting less rotation at higher torque from the engine 34 to the transmission 36. In the locked state, the torque converter 38 transmits all rotation from the engine 34 to the transmission 36, so the transmission 36 rotates at the same speed as the engine 34. The lock-up clutch may be intermediately engaged to allow partial slipping.

A lock-up schedule lists the conditions under which the torque converter 38 has different quantities of slip or is in the locked or the unlocked state. The conditions are based on variables describing the state of the engine 34 or the vehicle 30, such as accelerator pedal position, vehicle speed, the ratio of accelerator pedal position to vehicle speed, and other factors such as brake pedal position, engine speed, engine torque, engine temperature, transmission temperature, etc.

The transmission 36 is coupled to the torque converter 38, that is, directly or indirectly drivably connected to the torque converter 38. The transmission 36 transmits power generated by the engine 34 to a drive axle connected to wheels (not shown). The transmission 36 can change the gear ratio between input from the torque converter 38 and output to the drive axle. The transmission 36 may be any suitable type of transmission, including an automatic transmission with a set of defined gear ratios, called gears, or a continuously variable transmission. At higher gear ratios or lower gears, the transmission 36 transmits more torque at a higher engine speed to the drive axle, and at lower gear ratios or higher gears, the transmission 36 receives torque from the engine 34 at a slower engine speed for a given speed of the drive axle and transmits less torque to the drive axle.

Figure 2:
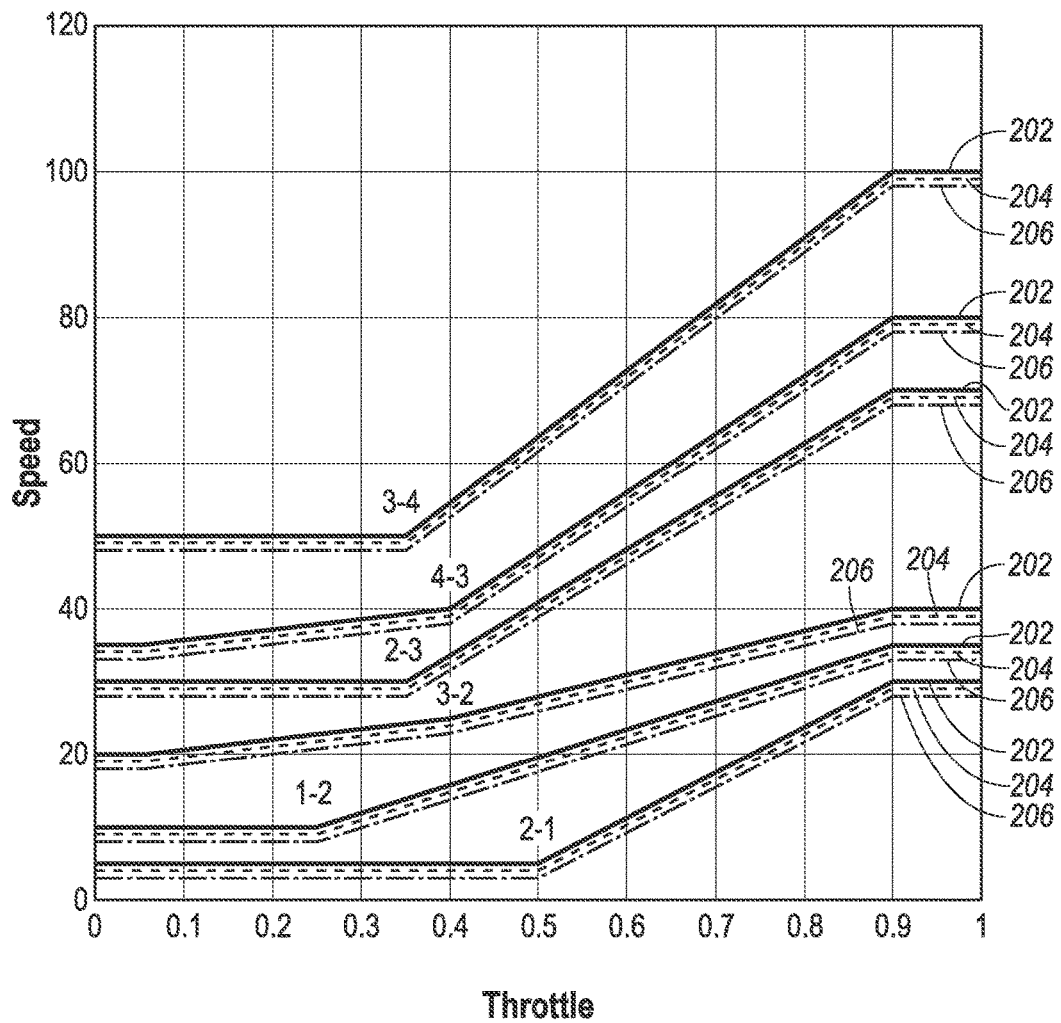
FIG. 2 is a graph of example transmission schedules.

A transmission schedule determines the gear ratio of the transmission 36 as a function of the vehicle speed and the position of an accelerator pedal or a throttle (not shown). For an automatic transmission 36, transmission schedule indicates the conditions under which the transmission 36 will shift between two gears as a function of the vehicle speed and the pedal or throttle. The throttle is an input device, such as a floor pedal, through which an occupant indicates a desired change in the vehicle acceleration or speed. FIG. 2 shows an example transmission schedule 202 for an automatic transmission in solid lines. The solid lines indicate the values of vehicle speed and throttle position at which the transmission 36 will shift between one gear and another gear; the line marked "2-1" shows the shift from second gear to first gear, "1-2" from first to second, "3-2" from third to second, and so on.

Figure 4:
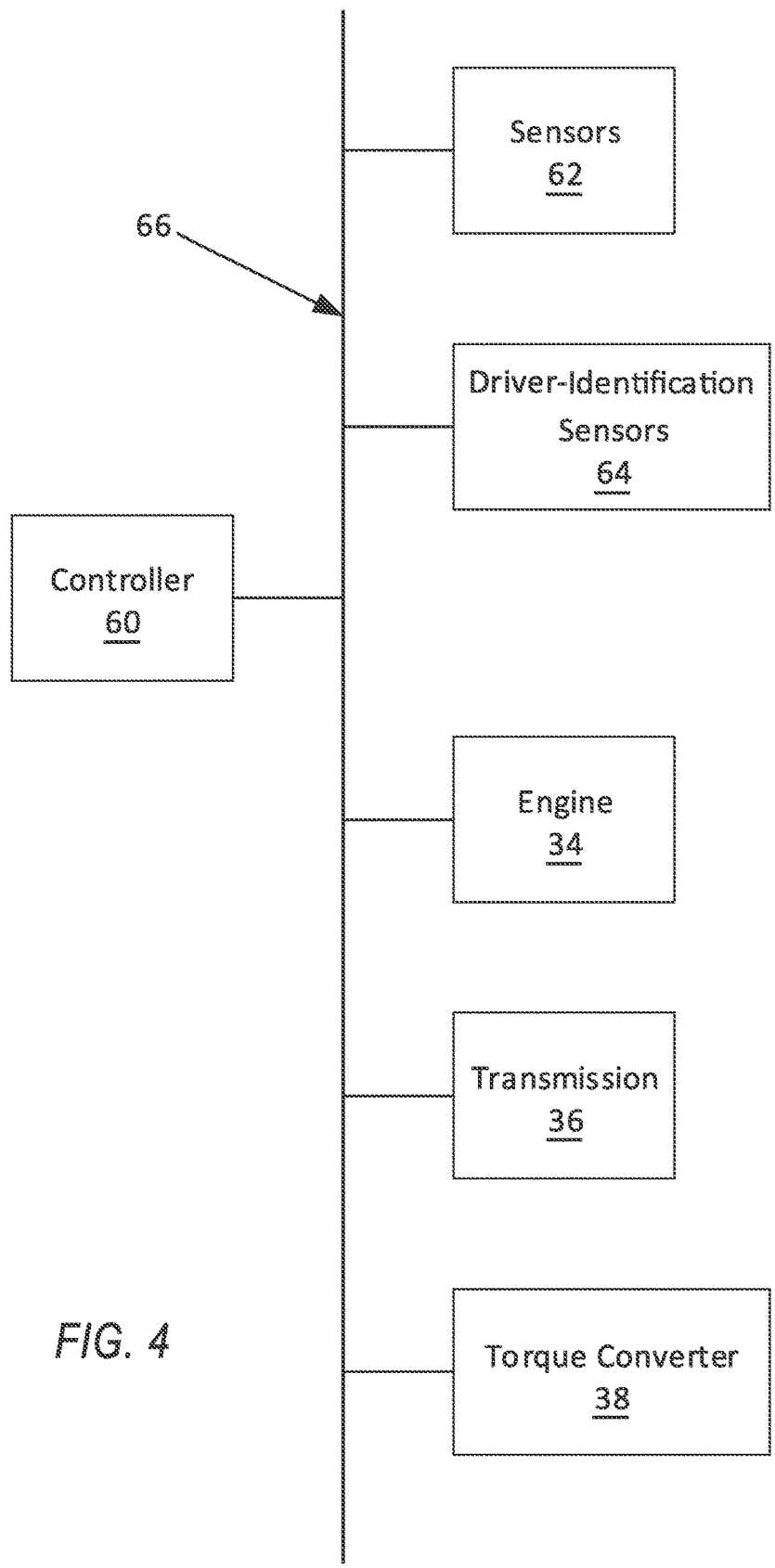
FIG. 4 is a block diagram of an example control system.

As shown in FIG. 4, the vehicle 30 includes sensors 64 configured to detect occupancy of the front seat 52 and of the back seat 54. The sensors 64 may be visible-light or infrared cameras directed at the front and back seats 52, 54, weight sensors inside the front and back seats 52, 54, sensors detecting whether a seat belt (not shown) is buckled or unspooled, or other suitable sensors. The sensors 64 are in communication with the controller 60 via a network 66. If the vehicle 30 is in manual mode, the controller 60 detect that the front seat 52 is necessarily occupied.

A driver-identification sensor 64 may be in communication with the controller 60. The driver-identification sensor 64 may detect an RFID or other signature unique to different keys of the vehicle 30, an input by an occupant of the vehicle 30, biometric data of an occupant of the vehicle 30, or any other suitable indicator of identity for an occupant of the vehicle 30. The identity of an occupant of the vehicle 30 may be tied to a classification of that occupant, for example, as a chauffeur or as a non-chauffeur.

As further shown in FIG. 4, the controller 60 is in communication with the engine 34, the transmission 36, and the torque converter 38. The controller 60 may be a microprocessor-based controller. The controller 60 may include a processor, memory, etc. The memory of the controller 60 may store instructions executable by the processor.

The controller 60 may transmit and receive signals through the communications network 66, such as a controller area network (CAN) bus, Ethernet, Local Interconnect Network (LIN), and/or by any other wired or wireless communications network.

Figure 5:
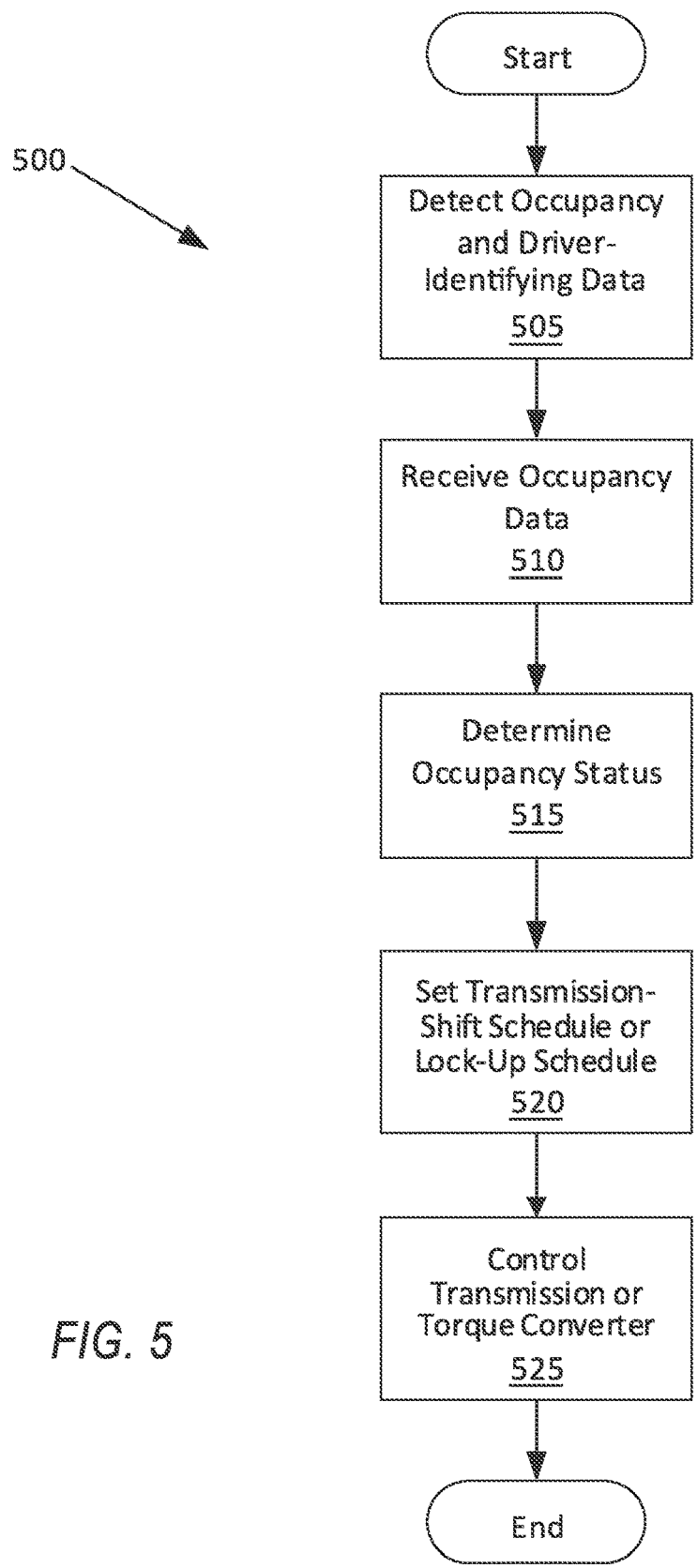
FIG. 5 is a process flow diagram of an exemplary process for adjusting the efficiency and noise, vibration, and harshness characteristics of the vehicle of FIG. 1.

FIG. 5 is a process flow diagram illustrating an exemplary process 500 for adjusting the NVH and efficiency characteristics of the vehicle 30 based on an occupancy status of the vehicle 30. The process begins in a block 505, in which the sensors 64 detect occupancy data and the driver-identification sensor 64 detects driver-identifying data. For example, if the sensors 64 are weight sensors, the sensors 64 may detect weight in the back seat 54 but not in the driver or passenger seat 52, 53.

Next, in a block 510, the controller 60 receives occupancy data from the sensors 64 and receives driver-identifying data from the driver-identification sensor 64 via the communications network 66.

Next, in a block 515, the controller 60 determines the occupancy status of the vehicle 30 based on received sensor data, including the occupancy data and the driver-identifying data. The controller 60 thus detects the occupancy status of the vehicle 30. The occupancy status may take on one of multiple statuses. There may be as few as two possible occupancy statuses, or there may be a unique occupancy status for each possible seating configuration. If the vehicle 30 is an SUV or minivan with eight seats, there may be as many as $2^8=256$ occupancy statuses without using driver-identifying data.

For example, the occupancy status may be one of "occupied" and "unoccupied." The occupancy status is occupied if the occupancy data indicates that at least one of the seats 52, 53, 54 is occupied. The occupancy status is unoccupied if the occupancy data indicates that all the seats 52, 53, 54 are unoccupied.

For another example, the occupancy status may be one of "front-seat-occupied," "back-seat-only-occupied," and "unoccupied." The occupancy status is front-seat-occupied if the occupancy data indicates that at least one of the driver seat 52 and the passenger seat 53 is occupied. The occupancy status is back-seat-only-occupied if the occupancy data indicates that both the driver seat 52 and the passenger seat 53 are unoccupied and the back seat 54 is occupied. The occupancy status is unoccupied if the occupancy data indicates that the seats 52, 53, 54 are unoccupied.

For a third example, the occupancy status may be one of "driver-seat-occupied," "passenger-seat-only-occupied," "back-seat-only-occupied," and "unoccupied." The occupancy status is driver-seat-occupied if the occupancy data indicates that the driver seat 52 is occupied. The occupancy status is passenger-seat-only-occupied if the occupancy data indicates that the passenger seat 53 is occupied and the driver seat 52 is unoccupied. The occupancy status is back-seat-only-occupied if the occupancy data indicates that the driver and passenger seats 52, 53 are unoccupied and the back seat 54 is occupied. The occupancy status is unoccupied if the occupancy data indicates that the driver, passenger, and back seats 52, 53, 54 are unoccupied.

For a fourth example, the occupancy status may be one of "front-seat-occupied," "chauffeur," "back-seat-only-occupied," and "unoccupied." The occupancy status is front-seat-occupied if the occupancy data indicates that the driver seat 52 or the passenger seat 53 is occupied and the driver-identifying data indicates that an occupant of the driver or passenger seat 52, 53 is a non-chauffeur. The occupancy status is chauffeur if the occupancy data indicates that the driver seat 52 is occupied, the passenger seat 53 is unoccupied, and the driver-identifying data indicates that an occupant of the driver seat 52 is a chauffeur. The occupancy status is back-seat-only-occupied if the occupancy data indicates that the driver and passenger seats 52, 53 are unoccupied and the back seat 54 is occupied. The occupancy status is unoccupied if the occupancy data indicates that the seats 52, 53, 54 are unoccupied. The chauffeur and back-seat-only-occupied statuses may be treated as the same occupancy status or as different statuses.

In addition to these three examples, other occupancy statuses and/or combinations of occupancy statuses are possible.

Next, in a block 520, the controller 60 sets an engine operating parameter based on the occupancy status. The engine operating parameter may be a parameter of one of the transmission 36 or the torque converter 38.

For example, the parameter may be the transmission schedule. The controller 60 may store a different transmission schedule for each possible occupancy status. The transmission 36 operates with a lower gear ratio for a given vehicle speed for occupancy statuses with less stringent NVH requirements. For automatic transmissions, for example, that means that the transmission 36 shifts at lower vehicle speeds for occupancy statuses with less stringent NVH requirements. For example, as shown in FIG. 2, a transmission schedule 206 for the unoccupied status (in dot-dashed lines) includes each gear ratio at lower speeds of the vehicle 30 than a transmission schedule 204 for the back-seat-only-occupied status (in dashed lines), and the transmission schedule 204 for the back-seat-only-occupied status includes each gear ratio at lower speeds of the vehicle 30 than the transmission schedule 202 for the driver-seat-occupied status (in solid lines) as well as than the transmission schedule for the passenger-seat-only-occupied status (not shown).

For another example, the parameter may be the lock-up schedule for the torque converter 38. The controller 60 may store a different lock-up schedule for each status that the occupancy status may take on. The torque converter 38 uses lower quantities of slip or more frequently enters the locked state for statuses with less stringent NVH requirements. For example, a lock-up schedule for the unoccupied status has quantities of slip no higher than, and under at least some vehicle conditions lower than, a lock-up schedule for the back-seat-only-occupied status; and the lock-up schedule for the back-seat-only-occupied status has rates of slip no higher than, and under at least some vehicle conditions lower than, a lock-up schedule for the front-seat-occupied status.

Next, in a block 525, the controller 60 controls one of the transmission 36 and the torque converter 38 to operate according to the parameter set as described above, that is, the transmission schedule and the lock-up schedule, respectively. The controller 60 may shift the transmission 36 according to the transmission schedule for the current occupancy status. The controller 60 may set the quantity of slip of the torque converter 38 according to a lock-up schedule for the current occupancy status. The process 500 ends following the block 525.

Figure 6:
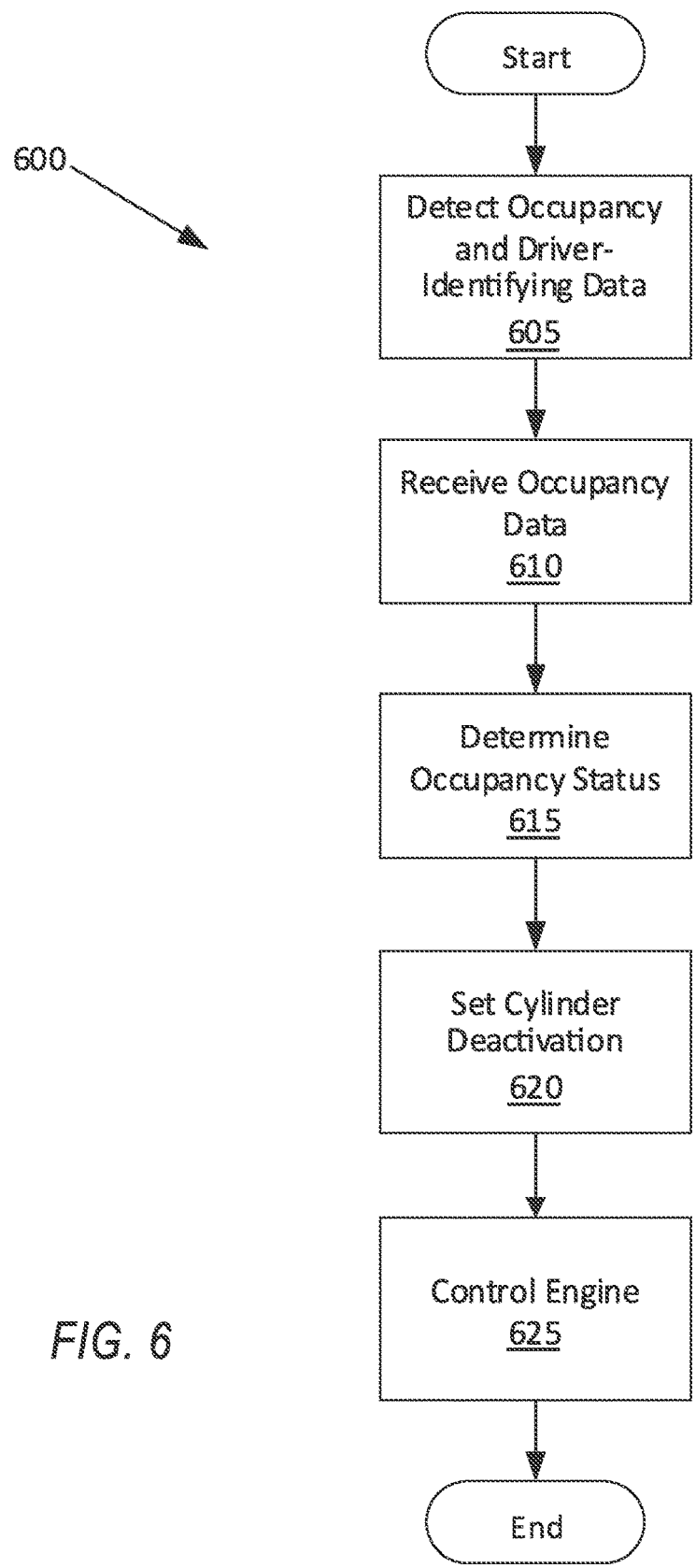
FIG. 6 is a process flow diagram of a second exemplary process for adjusting the efficiency and noise, vibration, and harshness characteristics of the vehicle of FIG. 1.

FIG. 6 is a process flow diagram illustrating an exemplary process 600 for adjusting the NVH and efficiency characteristics of the vehicle 30 based on an occupancy status of the vehicle 30. The process begins in a block 605, in which the sensors 64 detect occupancy data and the driver-identification sensor 64 detects driver-identifying data, as described above with respect to the block 505 of the process 500.

Next, in a block 610, the controller 60 receives occupancy data from the sensors 64 and receives driver-identifying data from the driver-identification sensor 64 via the communications network 66.

Next, in a block 615, the controller 60 determines the occupancy status of the vehicle 30 based on received sensor data, including the occupancy data and the driver-identifying data, as described above with respect to the block 515 of the process 500.

Next, in a block 620, the controller 60 sets the cylinder deactivation schedule based on the occupancy status. The controller 60 may store a different cylinder deactivation schedule for each possible occupancy status and thus select a set of active cylinders 40 from the plurality of cylinders 40 based on the occupancy status. Cylinder deactivation may occur more frequently for statuses with less stringent NVH requirements. For example, as shown in FIG. 3, a region 304 in which some cylinders 40 are deactivated may cover more vehicle conditions—specifically, at lower engine speeds and at higher torques—in the unoccupied status (dashed lines) than the region 302 in the occupied status (solid lines). In other words, a set of active cylinders 40 for the unoccupied status is no greater than, and for at least some vehicle conditions smaller than, a set of active cylinders 40 for the occupied status. For another example, a set of active cylinders 40 for the unoccupied status is no greater than, and for at least some vehicle conditions smaller than, a set of active cylinders 40 for the back-seat-only-occupied status; and the set of active cylinders 40 for the back-seat-only-occupied status is no greater than, and for at least some vehicle conditions smaller than, a set of active cylinders 40 for one of the driver-seat-occupied status and the passenger-seat-only-occupied status. For a third example, a set of active cylinders 40 for the unoccupied status is no greater than, and for at least some vehicle conditions smaller than, a set of active cylinders 40 for the chauffeur status; and the set of active cylinders 40 for the chauffeur status is no greater than, and for at least some vehicle conditions smaller than, a set of active cylinders 40 for one of the driver-seat-occupied status and the passenger-seat-only-occupied status.

Next, in a block 625, the controller activates a set of active cylinders 40 and deactivates a remainder of the plurality of cylinders 40 according to a cylinder deactivation schedule for the current occupancy status. The process 600 ends following the block 625.

To execute the exemplary processes 500 and 600, the controller 60 is programmed to receive occupancy data from the sensors 64, determine an occupancy status based on the occupancy data, set an engine operating parameter of one of the transmission 36 and the torque converter 38 based on the occupancy status, select a set of active cylinders 40 from the plurality of cylinders 40 based on the occupancy status, control one of the transmission 36 and the torque converter 38 to operate according to the parameter, and activate the set of active cylinders 40 and deactivate a remainder of the plurality of cylinders 40. The controller 60 may be further programmed to determine the occupancy status as occupied if the occupancy data indicates that at least one of the seats 52, 53, 54 are occupied and as unoccupied if the occupancy data indicates that the seats 52, 53, 54 are unoccupied. Alternatively or additionally, the controller 60 may be programmed to determine the occupancy status as driver-seat-occupied if the occupancy data indicates that the driver seat 52 is occupied, as passenger-seat-only-occupied if the occupancy data indicates that the passenger seat 53 is occupied, as back-seat-only-occupied if the occupancy data indicates that the driver and passenger seats 52, 53 are unoccupied and the back seat 54 is occupied, and as unoccupied if the occupancy data indicates that the seats 52, 53, 54 are unoccupied. Yet further alternatively or additionally, the controller 60 may be programmed to determine the occupancy status as front-seat-occupied if the occupancy data indicates that at least one of the driver and passenger seats 52, 53 is occupied and the driver-identifying data indicates that an occupant of the at least one of the driver and passenger seats 52, 53 is a non-chauffeur, as chauffeur if the occupancy data indicates that the driver seat 52 is occupied and the driver-identifying data indicates that an occupant of the driver seat 52 is a chauffeur, as back-seat-only-occupied if the occupancy data indicates that the front seat 52 is unoccupied and the back seat 54 is occupied, and as unoccupied if the occupancy data indicates that the seats 52, 53, 54 are unoccupied.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A controller comprising a processor and a memory for a vehicle including an engine with a plurality of cylinders, the controller programmed to:
   determine an occupancy status of the vehicle based on received sensor data, wherein the occupancy status is one of a front-seat-occupied status, a back-seat-only-occupied status, and an unoccupied status;
   select a set of active cylinders from the plurality of cylinders based on the occupancy status, wherein a set of active cylinders for the unoccupied status is no greater than, and for at least some vehicle conditions smaller than, a set of active cylinders for the back-seat-only-occupied status; and the set of active cylinders for the back-seat-only-occupied status is no greater than, and for at least some vehicle conditions smaller than, a set of active cylinders for the front-seat-occupied status; and
   activate the set of active cylinders and deactivate a remainder of the plurality of cylinders.

2. The controller of claim 1, wherein the occupancy status is one of a driver-seat occupied status, a passenger-seat-only-occupied status, the back-seat-only-occupied status, and the unoccupied status.

3. The controller of claim 2, wherein a set of active cylinders for the unoccupied status is no greater than, and for at least some vehicle conditions smaller than, a set of active cylinders for the back-seat-only-occupied status; and the set of active cylinders for the back-seat -only-occupied status is no greater than, and for at least some vehicle conditions smaller than, a set of active cylinders for one of the driver-seat-occupied status and the passenger-seat-only-occupied status.

4. A method of controlling a vehicle including an engine with a plurality of cylinders comprising:
   detecting an occupancy status of the vehicle, wherein the occupancy status is one of a front-seat-occupied status, a back-seat-only-occupied status, and an unoccupied status;
   selecting a set of active cylinders from the plurality of cylinders based on the occupancy status, wherein a set of active cylinders for the unoccupied status is no greater than, and for at least some vehicle conditions smaller than, a set of active cylinders for the back-seat-only-occupied status; and the set of active cylinders for the back-seat-only-occupied status is no greater than, and for at least some vehicle conditions smaller than, a set of active cylinders for the front-seat-occupied status; and
   activating the set of active cylinders and deactivating a remainder of the plurality of cylinders.

5. The method of claim 4, wherein the occupancy status is one of a driver-seat occupied status, a passenger-seat-only-occupied status, the back-seat-only-occupied status, and the unoccupied status.

6. The method of claim 5, wherein a set of active cylinders for the unoccupied status is no greater than, and for at least some vehicle conditions smaller than, a set of active cylinders for the back-seat-only-occupied status; and a set of active cylinders for the back-seat -only-occupied status is no greater than, and for at least some vehicle conditions smaller than, a set of active cylinders for one of the driver-seat-occupied status and the passenger-seat-only-occupied status.

7. A vehicle comprising:
   an engine including a plurality of cylinders;
   a controller in communication with the engine;
   a driver seat, a passenger seat, and a back seat coupled to the engine; and
   sensors configured to detect occupancy of the driver seat, of the passenger seat, and of the back seat and in communication with the controller; wherein
   the controller is programmed to
   receive occupancy data from the sensors,
   determine an occupancy status of the vehicle based on the occupancy data, wherein the occupancy status is one of a front-seat-occupied status, a back-seat-only-occupied status, and an unoccupied status, select a set of active cylinders from the plurality of cylinders based on the occupancy status, wherein a set of active cylinders for the unoccupied status is no greater than, and for at least some vehicle conditions smaller than, a set of active cylinders for the back-seat-only-occupied status; and the set of active cylinders for the back-seat-only-occupied status is no greater than, and for at least some vehicle conditions smaller than, a set of active cylinders for the front-seat-occupied status, and activate the set of active cylinders and deactivate a remainder of the plurality of cylinders.

8. The vehicle of claim 7, wherein the controller is further programmed to determine the occupancy status as a driver-seat-occupied status if the occupancy data indicates that the driver seat is occupied, as a passenger-seat-only-occupied status if the occupancy data indicates that the passenger seat is occupied and the driver seat is unoccupied, as the back-seat-only-occupied status if the occupancy data indicates that the driver and passenger seats are unoccupied and the back seat is occupied, and as the unoccupied status if the occupancy data indicates that the seats are unoccupied.

9. The vehicle of claim 8, wherein a set of active cylinders for the unoccupied status is no greater than, and for at least some vehicle conditions smaller than, a set of active cylinders for the back-seat-only-occupied status; and the set of active cylinders for the back-seat-only-occupied status is no greater than, and for at least some vehicle conditions smaller than, a set of active cylinders for one of the driver-seat-occupied status and the passenger-seat-only-occupied status.

10. The vehicle of claim 7, further comprising a driver-identification sensor in communication with the controller, wherein the controller is further programmed to receive driver-identifying data from the driver-identification sensor and determine the occupancy status based on the driver-identifying data.

11. The vehicle of claim 10, wherein the controller is further programmed to determine the occupancy status as the front-seat-occupied status if the occupancy data indicates that at least one of the driver and passenger seats is occupied and the driver-identifying data indicates that an occupant of the at least one of the driver and passenger seats is a non-chauffeur; as a chauffeur status if the occupancy data indicates that the driver seat is occupied, the passenger seat is unoccupied, and the driver-identifying data indicates that an occupant of the driver seat is a chauffeur; as the back-seat-only-occupied status if the occupancy data indicates that the driver and passenger seats are unoccupied and the back seat is occupied, and as the unoccupied status if the occupancy data indicates that the seats are unoccupied.

12. The vehicle of claim 11, wherein a set of active cylinders for the unoccupied status is no greater than, and for at least some vehicle conditions smaller than, a set of active cylinders for the chauffeur status; and the set of active cylinders for the chauffeur status is no greater than, and for at least some vehicle conditions smaller than, a set of active cylinders for the front-seat-occupied status.

13. The vehicle of claim 11, wherein the chauffeur status and the back-seat-only-occupied status are the same occupancy status.

14. The controller of claim 1, wherein the controller is further programmed to receive driver-identifying data from a driver-identification sensor and determine the occupancy status based on the driver-identifying data.

15. The controller of claim 14, wherein the controller is further programmed to determine the occupancy status as the front-seat-occupied status if the occupancy data indicates that at least one of the driver and passenger seats is occupied and the driver-identifying data indicates that an occupant of the at least one of the driver and passenger seats is a non-chauffeur; as a chauffeur status if the occupancy data indicates that the driver seat is occupied, the passenger seat is unoccupied, and the driver-identifying data indicates that an occupant of the driver seat is a chauffeur; as the back-seat-only-occupied status if the occupancy data indicates that the driver and passenger seats are unoccupied and the back seat is occupied, and as the unoccupied status if the occupancy data indicates that the seats are unoccupied.

16. The controller of claim 15, wherein a set of active cylinders for the unoccupied status is no greater than, and for at least some vehicle conditions smaller than, a set of active cylinders for the chauffeur status; and the set of active cylinders for the chauffeur status is no greater than, and for at least some vehicle conditions smaller than, a set of active cylinders for the front-seat-occupied status.

17. The controller of claim 15, wherein the chauffeur status and the back-seat-only-occupied status are the same occupancy status.

18. The method of claim 3, further comprising receiving driver-identifying data from a driver-identification sensor and determining the occupancy status based on the driver-identifying data.

19. The method of claim 18, further comprising determining the occupancy status as the front-seat-occupied status if the occupancy data indicates that at least one of the driver and passenger seats is occupied and the driver-identifying data indicates that an occupant of the at least one of the driver and passenger seats is a non-chauffeur; as a chauffeur status if the occupancy data indicates that the driver seat is occupied, the passenger seat is unoccupied, and the driver-identifying data indicates that an occupant of the driver seat is a chauffeur; as the back-seat-only-occupied status if the occupancy data indicates that the driver and passenger seats are unoccupied and the back seat is occupied, and as the unoccupied status if the occupancy data indicates that the seats are unoccupied.

20. The method of claim 19, wherein a set of active cylinders for the unoccupied status is no greater than, and for at least some vehicle conditions smaller than, a set of active cylinders for the chauffeur status; and the set of active cylinders for the chauffeur status is no greater than, and for at least some vehicle conditions smaller than, a set of active cylinders for the front-seat-occupied status.

* * * * *